United States Patent
O'Neill (10) Patent No.: US 7,090,182 B2
(45) Date of Patent: Aug. 15, 2006

(54) APPLIANCE MOUNTING DEVICE (75) Inventor: Edward L. O'Neill, Oakland, CA (US)

(73) Assignee: Lucasey Manufacturing Co., Oakland, CA (US)

( * ) Notice: Subject to any disclaimer, the term of this patent is extended or adjusted under 35 U.S.C. 154(b) by 51 days.

(21) Appl. No.: 11/010,868

(22) Filed: Dec. 13, 2004

(65) Prior Publication Data

US 2005/0236543 A1 Oct. 27, 2005

Related U.S. Application Data (63) Continuation-in-part of application No. 10/829,883, filed on Apr. 22, 2004, now Pat. No. 6,964,399.

(51) Int. Cl.
*A47F 5/00* (2006.01)
(52) U.S. Cl. ................... 248/289.11; 248/917
(58) Field of Classification Search ........... 248/289.11, 248/291.1, 917, 919, 920, 921, 922, 479, 248/286.1
See application file for complete search history.

(56) References Cited

U.S. PATENT DOCUMENTS

| | | | | |
|---|---|---|---|---|
| D275,431 S * | 9/1984 | Usab | .......................... | D14/452 |
| 4,852,842 A * | 8/1989 | O'Neill | ..................... | 248/284.1 |
| 6,478,274 B1 * | 11/2002 | Oddsen, Jr. | ............... | 248/274.1 |
| 6,554,242 B1 * | 4/2003 | Kim | ............................ | 248/371 |
| 6,601,811 B1 * | 8/2003 | Van Lieshout | ............ | 248/282.1 |
| D488,708 S * | 4/2004 | Lam et al. | ..................... | D8/363 |
| 6,886,701 B1 * | 5/2005 | Hong et al. | .................... | 211/99 |
| 2004/0262474 A1 * | 12/2004 | Boks et al. | ............... | 248/276.1 |

* cited by examiner

*Primary Examiner*—Ramon O Ramirez
(74) *Attorney, Agent, or Firm*—Niro, Scavone, Haller & Niro (57) ABSTRACT

In another embodiment, the above-mentioned design considerations are achieved by a mounting device having a generally vertical mounting post, a base plate, a pair of base brackets, and securing fixtures. The post is securable at one end to a support surface, such as a table or counter top, or even a floor or ceiling. The base plate is, in turn secured to the mounting post and has upper and lower flanges which are engaged by first and second retainers on each of the base brackets. The base brackets include fixtures that secure the appliance to the mounting assembly. Also, the base plate, brackets and appliance are rotatable about the axis of the mounting post.

4 Claims, 8 Drawing Sheets

APPLIANCE MOUNTING DEVICE

RELATED APPLICATIONS

The present application is a continuation-in-part of commonly owned U.S. patent application Ser. No. 10/829,883 filed Apr. 22, 2004 now U.S. Pat. No. 6,964,399 and entitled "Appliance Mounting Device."

BACKGROUND OF THE INVENTION

The present invention relates generally to an apparatus for adjustably mounting an appliance. More particularly, the invention relates to a device used to adjustably and securely mount an appliance such as a flat screen television.

When an appliance such as a flat screen TV is mounted on a support surface such as a wall or other structure, several design considerations should be considered. Positional adjustment may be highly desirable. For example, in a flat screen TV application, the monitor often may need to be oriented toward the viewing audience. In some instances, it may be desirable to angle or tilt the screen to eliminate glare that may otherwise result from an external light source. To take advantage of the flat screen design, it may also be desirable to mount the appliance in close proximity to the mounting surface. The mounting device preferably also has a relatively slim profile, with as much of the device hidden from view as possible for enhanced aesthetic appearance. In other instances it may be desirable to mount a flat screen TV to a table or counter top with a structure having a simplistic and aesthetically attractive design.

The present invention achieves all of these objectives and provides new advantages not previously obtainable with prior appliance mounting devices.

SUMMARY OF THE INVENTION

The present invention provides a novel solution to the above-mentioned design considerations by providing a mounting device that includes a base plate, one or more base brackets and associated swing brackets, a spring assembly, and a spring force adjustment assembly. The base plate includes a back panel and upper and lower flanges which are displaced from the plane of the back panel. The base bracket includes first and second retainers that engage, respectively, the upper and lower flanges. The swing bracket is pivotally connected to the base bracket and can be positioned in many different angular orientations relative to the base bracket. The appliance, in turn, is mounted to the swing bracket. The force adjustment assembly allows the force applied to the swing bracket to be varied.

In another embodiment, the above-mentioned design considerations are achieved by a mounting device having a generally vertical mounting post, a base plate, a pair of base brackets, and securing fixtures. The post is securable at one end to a support surface, such as a table or counter top, or even a floor or ceiling. The base plate is, in turn, secured to the mounting post and has upper and lower flanges which are engaged by first and second retainers on each of the base brackets. The base brackets include fixtures that secure the appliance to the mounting assembly. Also, the base plate, brackets and appliance are rotatable about the axis of the mounting post.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Set forth below is a description of what are believed to be the preferred embodiments and/or best examples of the invention claimed. Alternatives and modifications to this preferred embodiment are contemplated, and any such alternatives or modifications which make insubstantial changes in function, in purpose, in structure, or in result are intended to be covered by the claims of this patent.

With reference now to the various FIGS. 1–10, an apparatus constructed in accordance with one preferred embodiment of the present invention is designated generally by reference numeral 20 and is shown for use in mounting a flat panel TV 25 to any suitable surface, typically a generally vertical wall. The apparatus includes, as major components, a base plate 30, one or more elongated base brackets 40 and associated swing brackets 50, a spring assembly 60, and a spring adjustment assembly 65.

Base plate 30 includes a generally planer back panel 32 having an array of slotted apertures 34 for conveniently mounting the apparatus to the wall surface by any one of the many fastening techniques well known to those of skill in the art. Base plate 30 also has upper and lower flanges 36 and 38 which are displaced from the plane of back panel 32.

Figures 1, 2, 3, 4, 5:
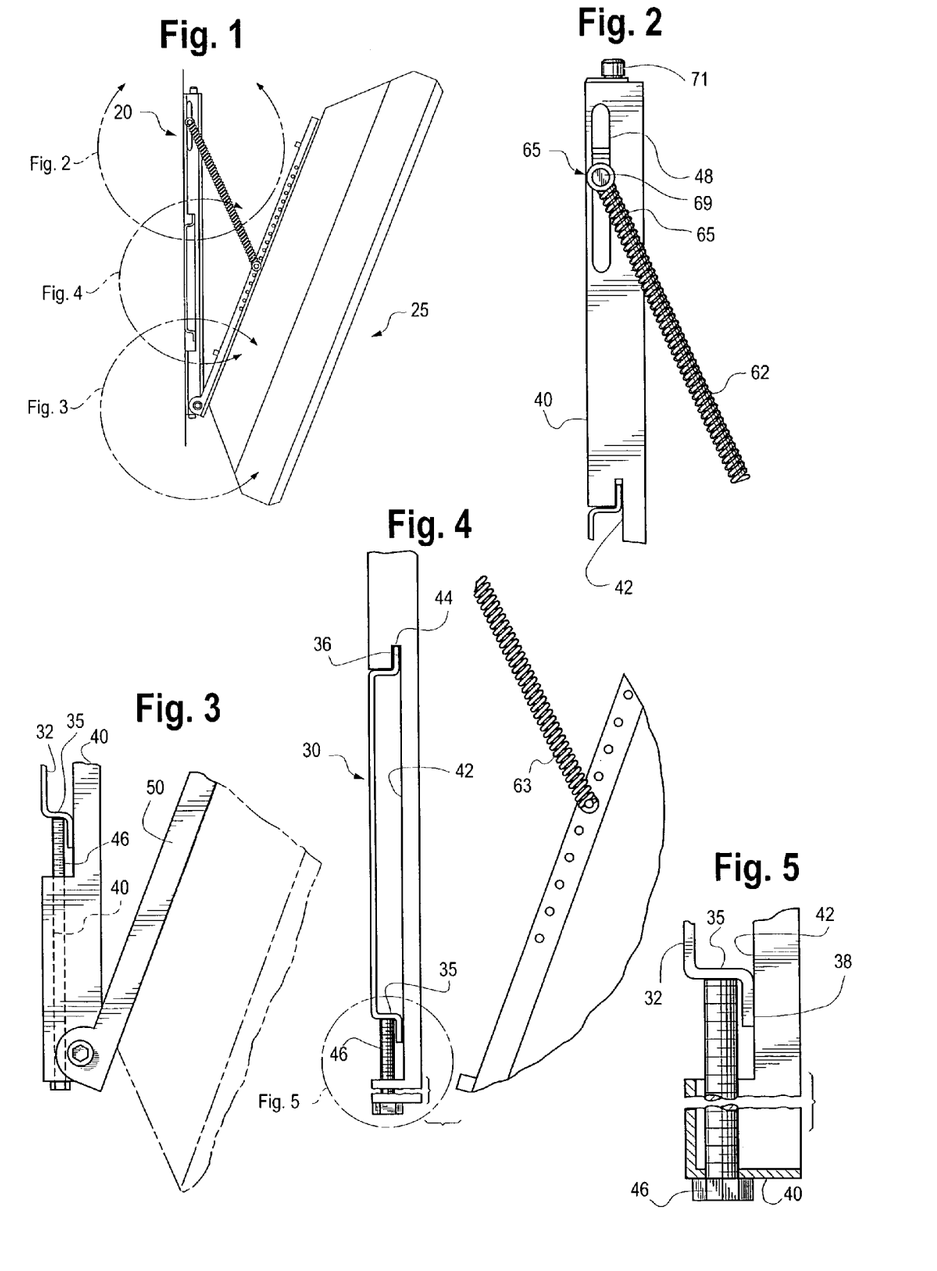
FIG. 1 is a side view of one preferred embodiment of the appliance mounting device of the present invention.
FIGS. 2–4 are enlarged views of the circled portions of the device shown in FIG. 1 with the corresponding figure number.
FIG. 5 is an enlarged view of the circled portion of the device shown in FIG. 4.
Figure 6:
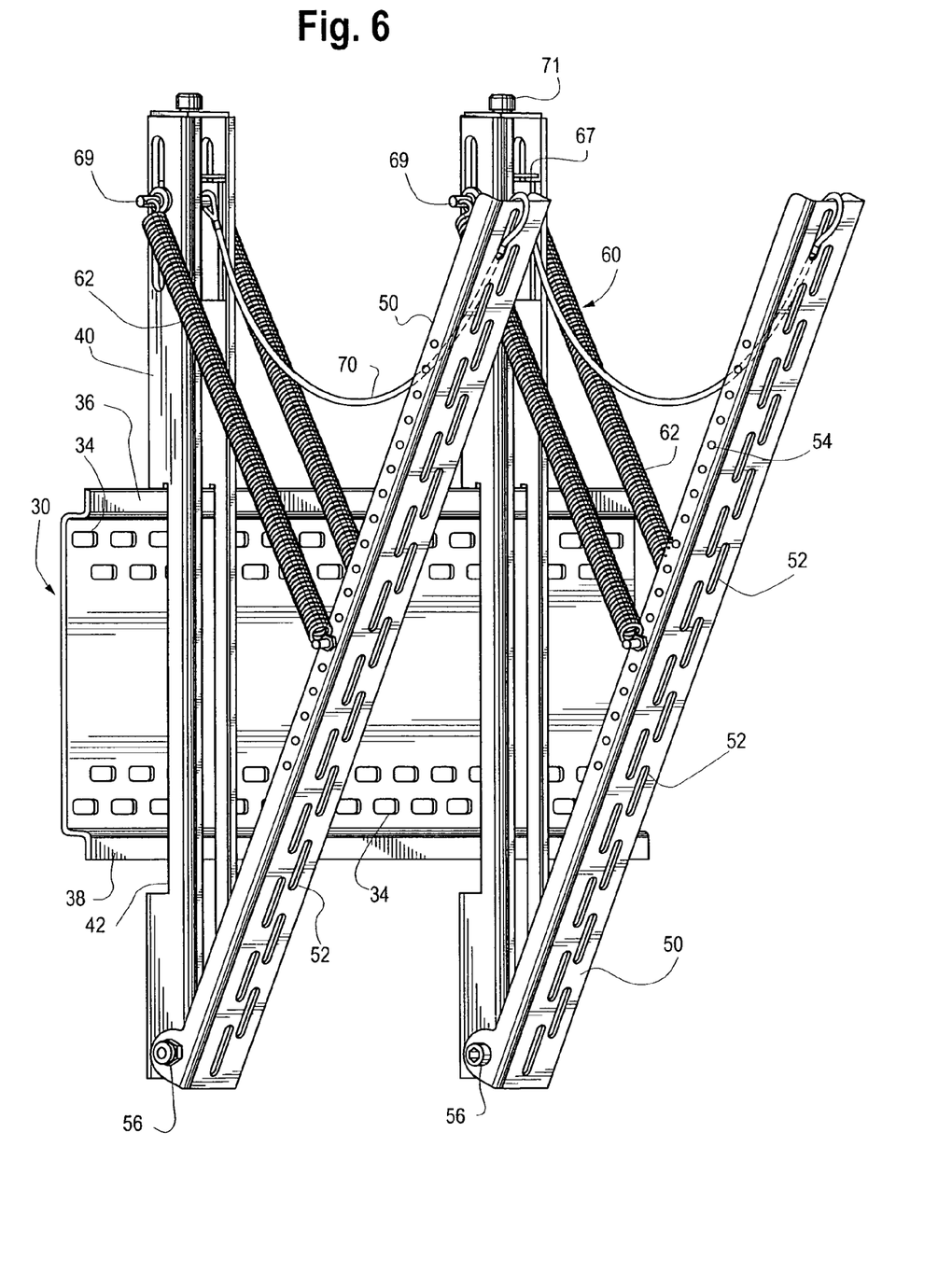
FIG. 6 is a front perspective view of the device shown in FIG. 1.
Figure 7:
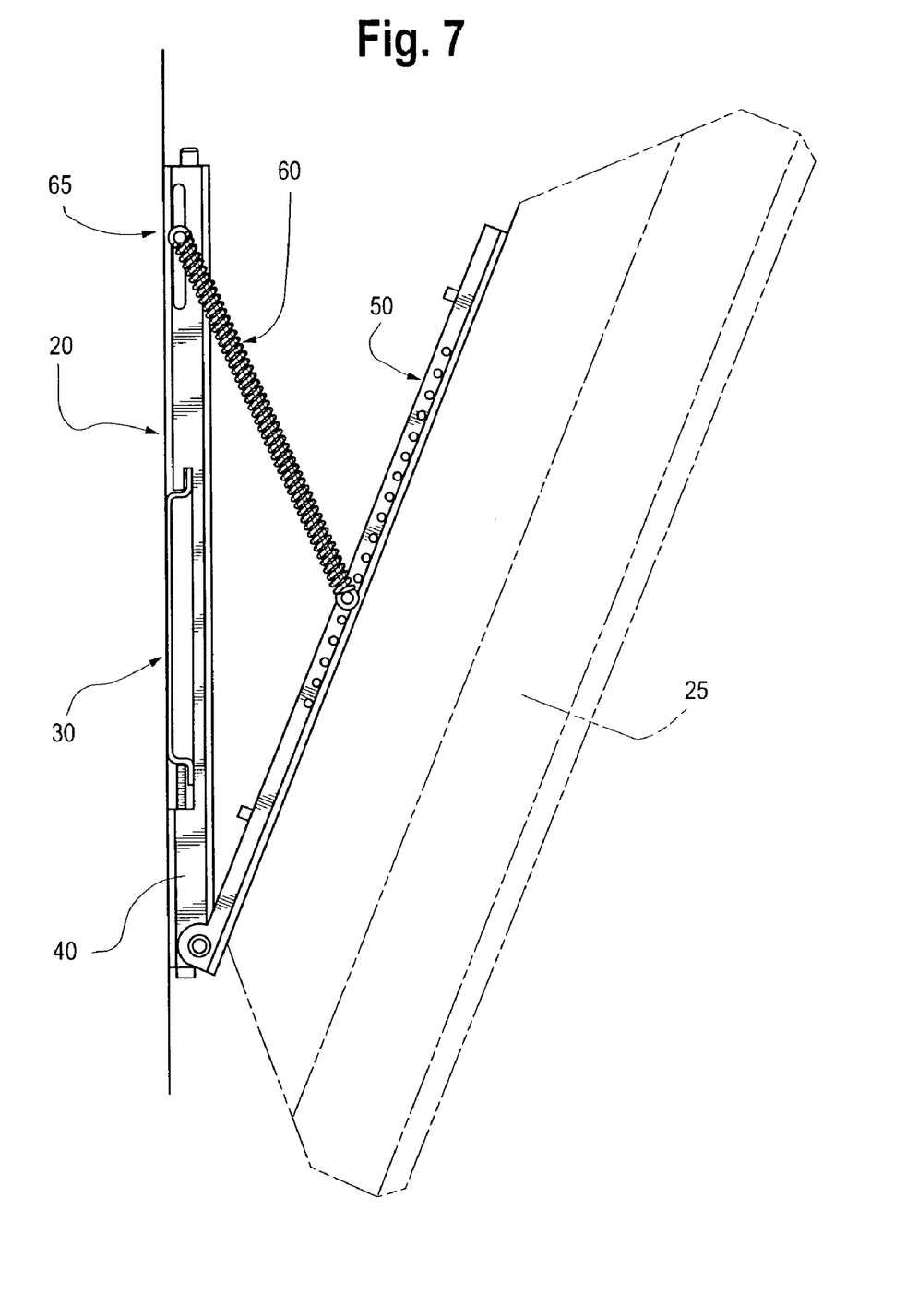
FIG. 7 is an enlarged view of the device shown in FIG. 1.
Figure 8:
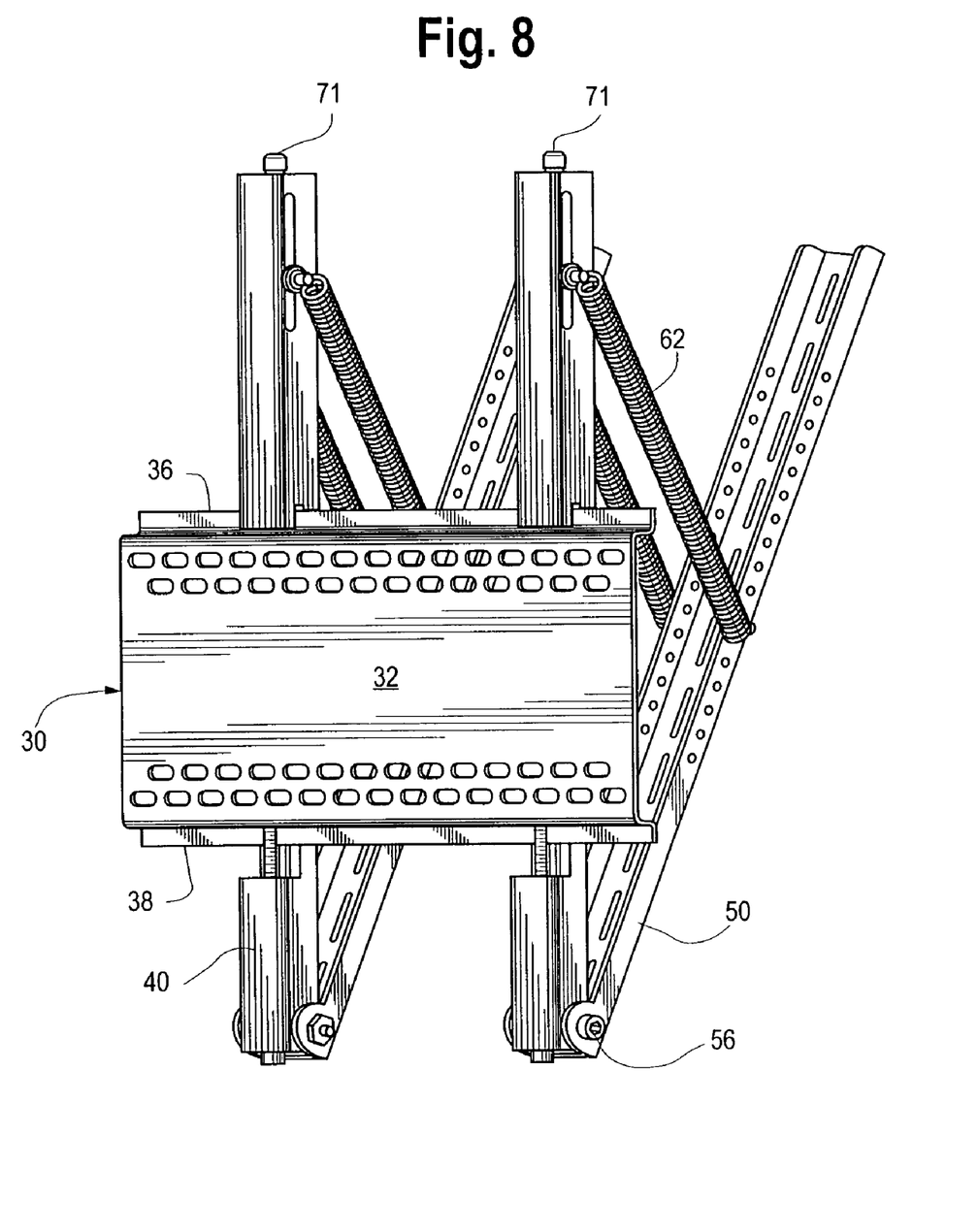
FIG. 8 is a rear perspective view of the device.

Each base bracket 40 is provided with first and second retainers to engage the base plate upper and lower flanges, respectively. In the illustrated embodiment, the base bracket includes a rear recess 42 having a slot 44 which comprises the first retainer and adapted to receive the upper base plate flange 36. The second retainer comprises a fastener, preferably a threaded fastener such as bolt 46, positioned to capture the base plate lower flange 38. As illustrated in FIGS. 3–5, bolt 46 may extend upwardly from the end of the base bracket 40 so that its free end engages shoulder 35 on the base plate 30 and therefore locking the base plate and bracket in assembled relation. Recess 42 is preferably dimensioned so that the base bracket is mounted very close to or in contact with the wall surface to minimize the space requirements of the apparatus. In other words, the depth of the recess 42 is generally equal to the amount of displacement of the base plate flanges 36 and 38 relative to the base plate back panel 32. The base bracket 40 also preferably includes upper slots 48 whose functionality will be described below.

A swing bracket 50 is associated with each base bracket 40. In the illustrated embodiment, swing bracket 50 is pivotally mounted at its lower end to the lower end of the base bracket, allowing the swing brackets to be oriented at various angular positions relative to the base brackets and, therefore, relative to the wall surface as well. The swing brackets 50 are also provided with a plurality of elongated apertures 52 to accommodate the many different mounting site locations found on different sizes and brands of appliances 25. Preferably, the swing bracket also has a series of side apertures 54 to allow different mounting locations for the spring assembly 60. The swing bracket is pivotally connected to the base bracket 40 via a threaded pivot axis having pivot nuts 56 on each end.

The spring assembly 60 shown in the illustrated embodiment comprises on or more extension springs 62, each attached at one end 63 to the swing brackets 50 and at the other end 65 to the base brackets 40. Preferably, the spring assembly cooperates with a spring adjustment assembly, designated generally by reference numeral 65, allowing the biasing force applied to the swing brackets 50 by the springs 62 to be varied.

The spring adjustment assembly 65 includes a carriage 67 to which the rod 69 is fixed. The rod 69 serves to anchor the upper spring end 65.The carriage 67 is movably nested with the base bracket 40. The ends of rod 69 extend through and are captured by slots 48, thereby limiting the movement of the rod along the length of the base bracket 40. The carriage 67, in turn, engages the threaded fastener 71 located at the top of bracket 40. Therefore, by adjustment of fastener 71, the carriage 67 and rod 69 may be moved along the portion of the base bracket length defined by slots 48, and thereby adjust the amount of biasing force applied via the springs 62 to the swing brackets 50.

In use, the base plate 30 may be appropriately positioned and secured to the wall and the appliance 25 assembled to one or more swing brackets, as needed. Then the appliance and brackets are lifted onto the base plate, so that the slots 44 of the base brackets engage the upper flange 36 of base plate 30. Because the upper flange extends substantially across the width of the base plate, positioning of the appliance is facilitated and a single sized base plate can accommodate many different TVs with widely different mounting site locations. Once properly positioned on the base plate, the assembly is secured to the base plate by tightening the base bracket fasteners 46. Next, the angular orientation of the appliance may be set by adjustment of the fasteners 71. Once properly positioned, the pivot nuts 56 are tightened to further secure the appliance in the desired position. Safety cables 70 are preferably employed to prevent catastrophic failure of the mounting device.

Figure 9:
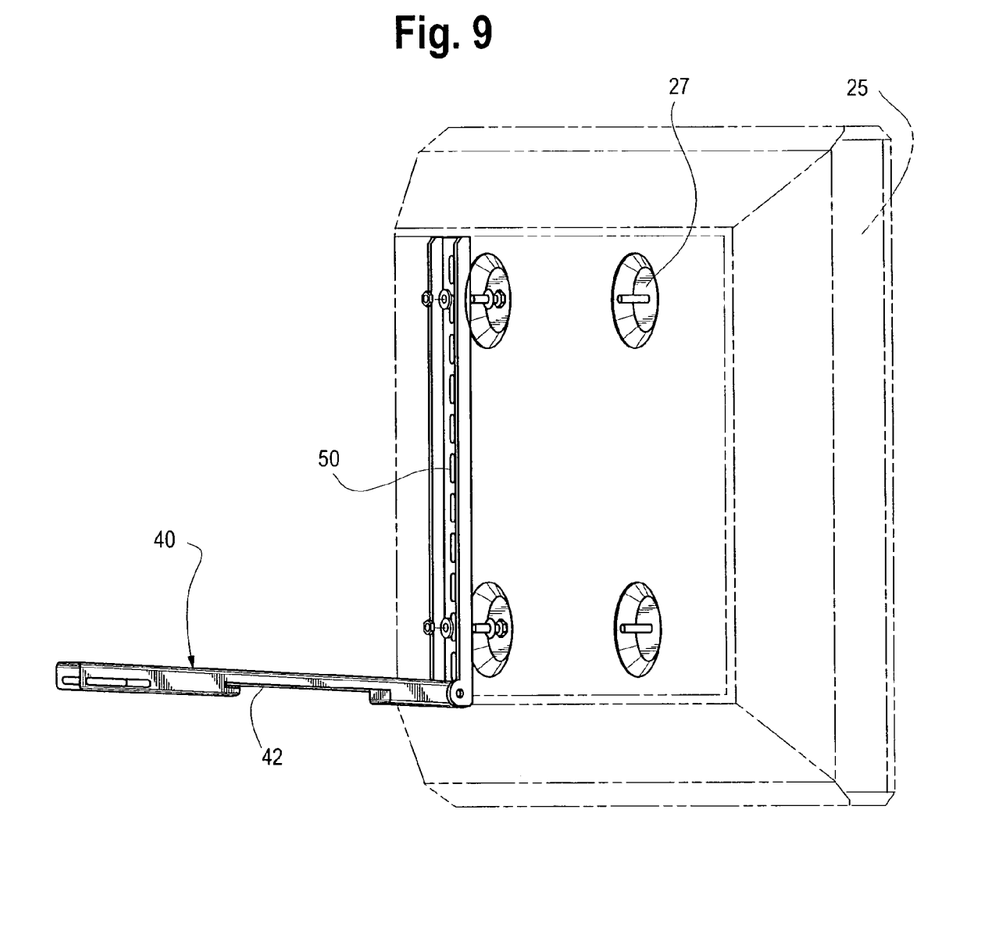
FIG. 9 is a rear perspective view illustrating a preferred technique for assembling the device shown in FIG. 1 to an appliance having recessed mounting sites.
Figure 10:
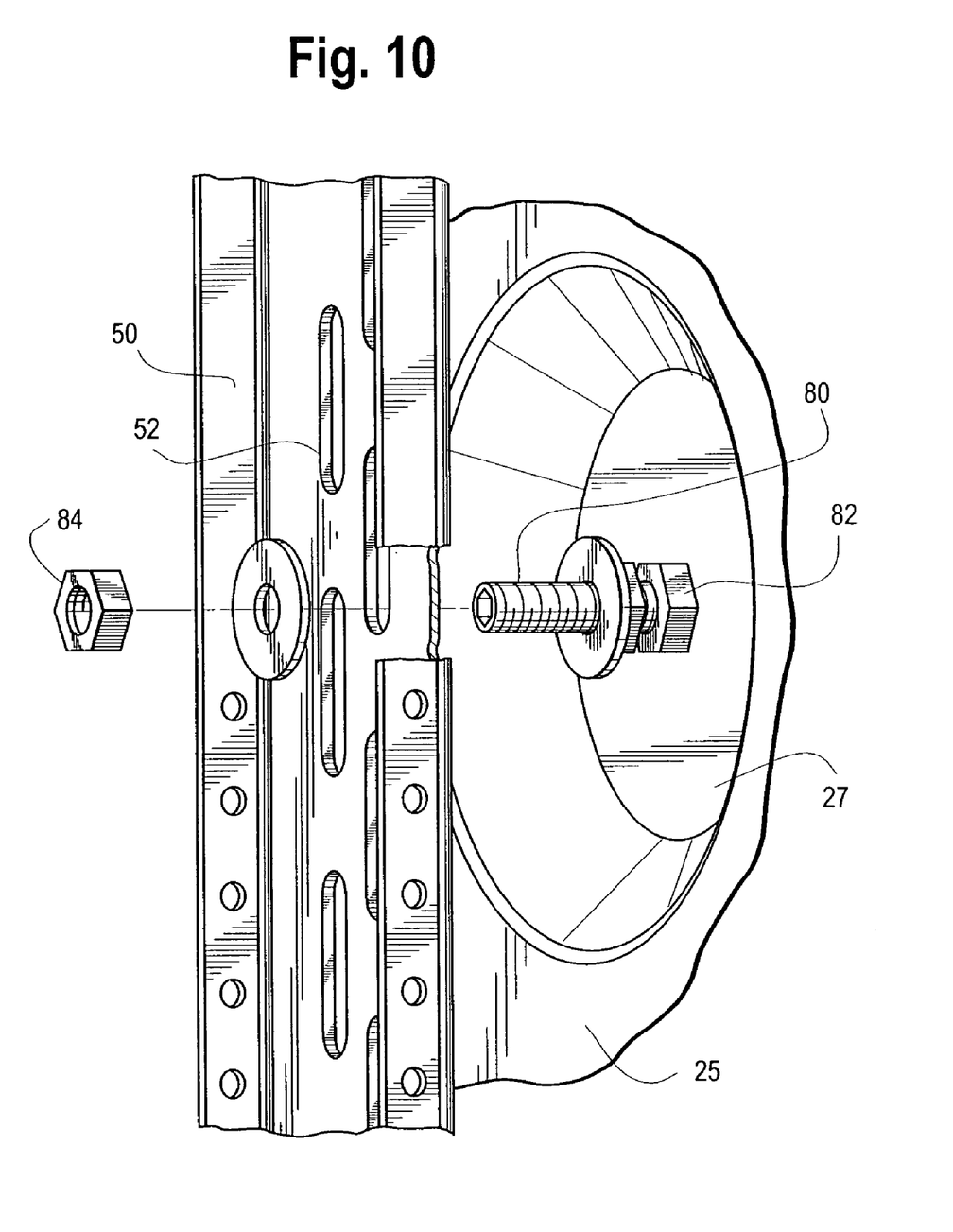
FIG. 10 is an enlarged exploded view of a portion of FIG. 9.
Figure 11:
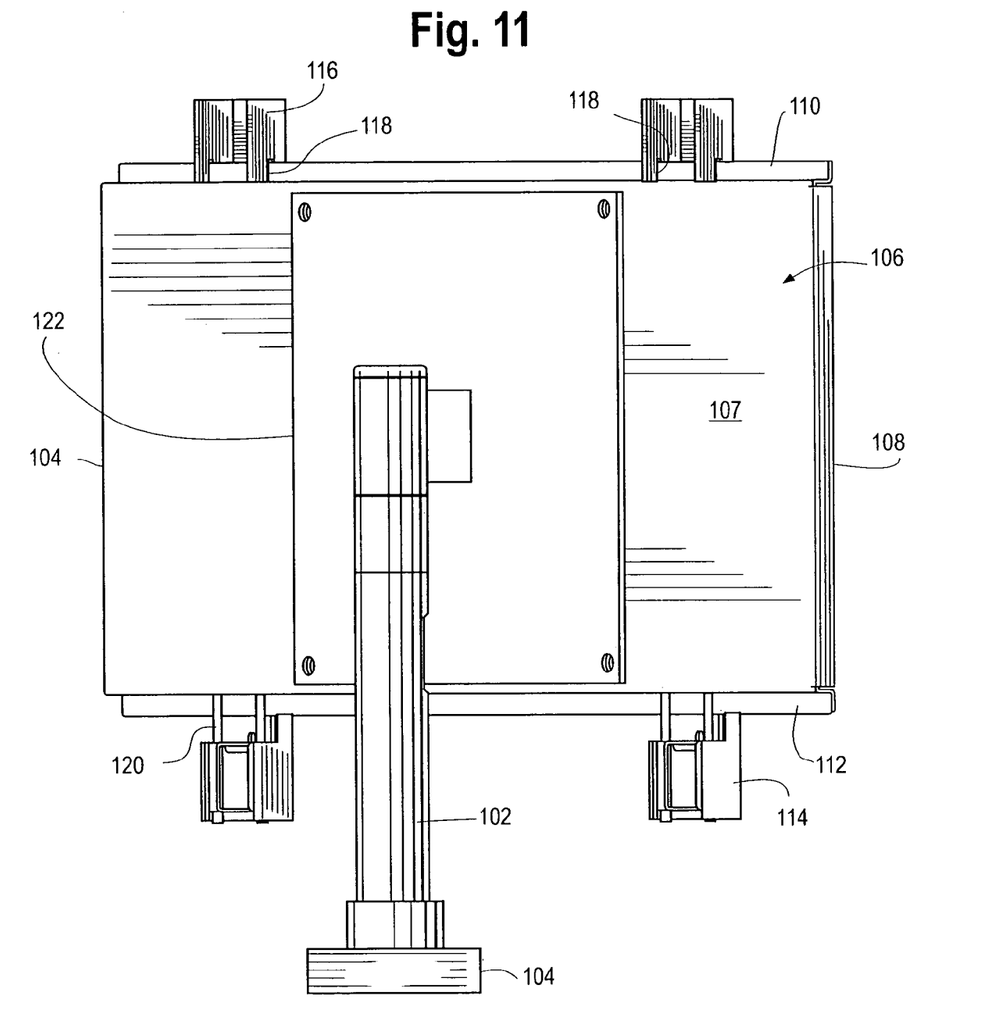
FIG. 11 is a rear perspective view of another embodiment of the invention adapted to mount the flat panel TV to a horizontal support surface.
Figure 12:
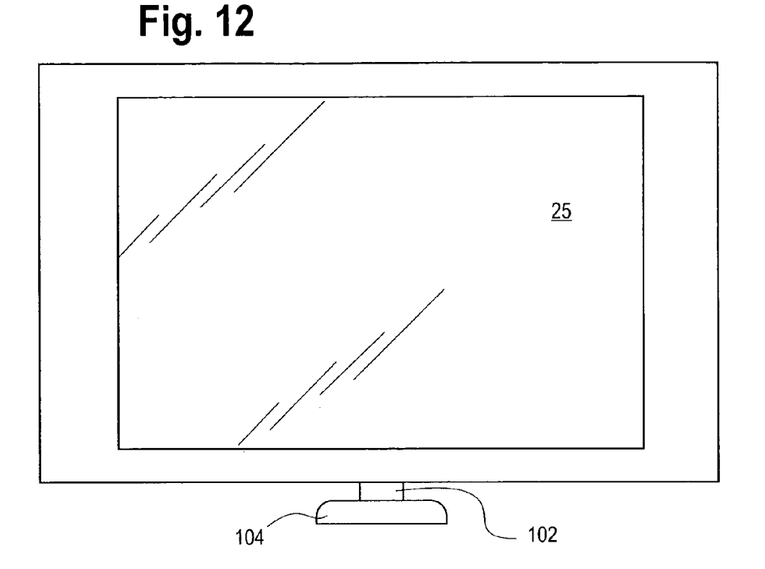
FIGS. 12, 13 and 14 are, respectively, front, top and side views of the embodiment illustrated in FIG. 11 shown with a flat panel TV.
Figure 13:
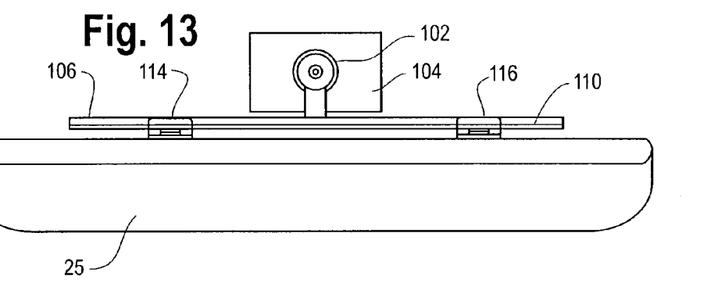
Figure 14:
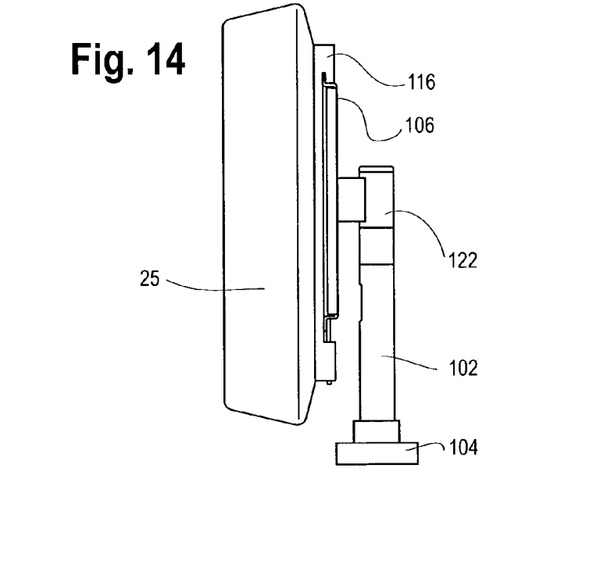

FIGS. 9 and 10 illustrate an assembly arrangement when the apparatus of the present invention is used with an appliance having recessed mounting sites. Typically, such sites include a well 27 with a centrally located threaded aperture. Studs 80 may be threaded into these apertures and lock nuts 82 used to fix the axial position of the studs. Then, the swing brackets 50 are located over the studs 80, through apertures 52, and secured to the studs via nuts 84. In the case where the appliance has flush mounting sites, the brackets 50 are simply bolted directly to the back of the appliance.

With reference now to FIGS. 11 through 14, a second embodiment of the present invention is illustrated and designated generally as 100. This embodiment is intended to mount the appliance, such as a flat panel TV 25, to a generally horizontal surface. The support surface might be the top surface of a desk, chest, or counter; or it might be the floor or ceiling of the room. The mounting apparatus 100 includes a mounting post 102 that is secured to the support surface by pedestal 104 or another of the many fixtures well known in the art for such purposes. A base plate 106 is connected to the post 102 via collar 122. The base plate has opposing side edges 108 and 109 and upper and lower flanges 110 and 112 extending between the side edges. Two elongated base brackets 114 and 116 engage the base plate 106. For this purpose, each base bracket has a first retainer in the form of a recess 118 that engages the upper flange of the base plate and a second retainer in the form of an adjustable fastener that engages the lower flange. The second retainer may comprise a threaded bolt, lock pin or other mechanical device well known to those of ordinary skill in the art. Preferably, the base plate 106 has a back panel 107 and the upper flange 110 or lower flange 112 or both are displaced from the plane of the back panel. The base brackets are also provided with fixtures (such as the slotted apertures 52 shown in FIG. 6) or other known structures to mount the TV 25 to the apparatus 100. With flanges 110 and 112 extending between the sides of base plate 106, the brackets 114 and 116 may be positioned at many different points along the base plate to thereby accommodate a variety of TV sizes. The use of collar 122 allows the base plate, brackets and mounted TV to rotate about the axis of the mounting post 102 to facilitate viewing from different locations in the room.

Other changes and modifications constituting insubstantial differences from the present invention, such as those expressed here or others left unexpressed but apparent to those of ordinary skill in the art, can be made without departing from the spirit and scope of the present invention and without diminishing its attendant advantages. For example, the springs 62 may be anchored to the base plate rather than to the base bracket. Likewise, the spring force adjustment assembly may be associated with the base plate or the wing bracket rather than with the base bracket. It is, therefore, intended that such changes and modifications be covered by the following claims.

I claim:

1. An appliance mounting apparatus comprising:
   a generally vertical mounting post securable at one end to a support surface;
   a base plate secured to the mounting post and having an upper flange and a lower flange extending, respectively, along the top and bottom between opposing sides of the base plate;
   a pair of elongated base brackets, each bracket having a first retainer to engage the base plate upper flange and a second retainer to engage the base plate lower flange, each of the base brackets being positionable at a plurality of locations between the opposing sides of the base plate;
   the base brackets having assembly fixtures for securing the appliance; and
   the base plate, brackets and appliance being rotatable on the axis of said mounting post.

2. The appliance mounting apparatus of claim 1 wherein said base plate has a back panel and the upper flange is displaced from the plane of the back panel.

3. The appliance mounting apparatus of claim 1 wherein the first retainer of each base bracket comprises a recess having a configuration to receive the base plate upper flange.

4. The appliance mounting apparatus of claim 1 wherein the second retainer of each base bracket comprises an adjustable fastener that secures each base bracket to the base plate.

* * * * *